(12) United States Patent
Chinda

(10) Patent No.: US 7,641,171 B2
(45) Date of Patent: Jan. 5, 2010

(54) FLUID CONTROL VALVE

(75) Inventor: Hiroshi Chinda, Saitama (JP)

(73) Assignee: Fujikura Rubber Ltd., Tokyo (JP)

( * ) Notice: Subject to any disclaimer, the term of this patent is extended or adjusted under 35 U.S.C. 154(b) by 332 days.

(21) Appl. No.: 11/815,126

(22) PCT Filed: Jan. 17, 2006

(86) PCT No.: PCT/JP2006/300473

§ 371 (c)(1),
(2), (4) Date: Jul. 31, 2007

(87) PCT Pub. No.: WO2006/082703

PCT Pub. Date: Aug. 10, 2006

(65) Prior Publication Data

US 2009/0032751 A1    Feb. 5, 2009

(30) Foreign Application Priority Data

Feb. 2, 2005    (JP) ............................. 2005-026587

(51) Int. Cl.
*F16K 31/08* (2006.01)
(52) U.S. Cl. ..................... 251/65; 251/129.1
(58) Field of Classification Search ............ 251/65, 251/129.1, 129.09, 122
See application file for complete search history.

(56) References Cited

U.S. PATENT DOCUMENTS 4,819,682 A * 4/1989 Van Marcke ................ 137/1
5,947,155 A * 9/1999 Miki et al. ............. 137/625.65
2004/0244834 A1* 12/2004 Kainuma et al. ......... 137/116.5

FOREIGN PATENT DOCUMENTS

| JP | 52-143592 | 10/1977 |
| JP | 60-167279 | 11/1985 |
| JP | 6272784 | 9/1994 |
| JP | 7055043 | 3/1995 |

OTHER PUBLICATIONS

International Search Report for PCT/JP2006/300473.

* cited by examiner

*Primary Examiner*—John K Fristoe, Jr.
*Assistant Examiner*—Marina Tietjen
(74) *Attorney, Agent, or Firm*—McCormick, Paulding & Huber LLP

(57) ABSTRACT

An object of the present invention is to obtain a quick-response fluid control valve.

A fluid control valve includes a pressure chamber including an output port; an air supply nozzle and an air exhaust nozzle which are communicatively connected to the pressure chamber and positioned on a common straight line; a flapper assembly which is movable between the air supply nozzle and the air exhaust nozzle and includes a pair of opening/closing control surfaces that face an opening end of the air supply nozzle and an opening end of the air exhaust nozzle, respectively; and a flapper-assembly moving mechanism which moves the flapper assembly so that a distance between the opening end of the air supply nozzle and one of the pair of opening/closing control surfaces increases while a distance between the opening end of the air exhaust nozzle and the other of the pair of opening/closing control surfaces decreases.

7 Claims, 4 Drawing Sheets

FLUID CONTROL VALVE

CROSS REFERENCE TO RELATED APPLICATION

This application claims the benefit of PCT Application No. PCT/JP2006/300473, filed Jan. 17, 2006 and Japanese Patent Application No. 2005-26587, filed Feb. 2, 2005, the disclosures of which are herein incorporated by reference in their entirety.

FIELD OF THE INVENTION

The present invention relates to a fluid control valve which selectively exerts pressure of an air supply port on control ports.

BACKGROUND OF THE INVENTION

A fluid supply valve used for exerting pressure on a pressure-controlled device as constant as possible, is known in the art.

Although a quick response is required in this type of conventional fluid supply valve, the response thereof is not always sufficiently quick enough. Additionally, although it is absolutely necessary to increase the velocity of flow of air to improve the response of the fluid supply valve, there has been a problem with a stable performance not being achievable due to uncertain vortexes, shock waves, boundary-layer separation point variations, stagnation, etc., occurring if the velocity of flow of air is increased.

An object of the present invention is to obtain a quick-response fluid control valve. Another object of the present invention is to obtain a fluid control valve which exhibits a stable performance, and presents no problem, such as the occurrence of shock waves.

SUMMARY OF THE INVENTION

The fluid control valve according to the present invention is characterized by having a pressure chamber including an output port; an air supply nozzle and an air exhaust nozzle which are communicatively connected to the pressure chamber and positioned on a common straight line; a flapper assembly which is movable between the air supply nozzle and the air exhaust nozzle and includes a pair of opening/closing control surfaces that face an opening end of the air supply nozzle and an opening end of the air exhaust nozzle, respectively; and a flapper-assembly moving mechanism which moves the flapper assembly so that a distance between the opening end of the air supply nozzle and one of the pair of opening/closing control surfaces increases while a distance between the opening end of the air exhaust nozzle and the other of the pair of opening/closing control surfaces decreases.

The flapper assembly can be biased by a spring device to move in a direction to make the aforementioned one of the pair of opening/closing control surfaces come into intimate contact with the air supply nozzle to close the air supply nozzle.

It is desirable that the fluid control valve be further provided with a tapered surface which is formed at the opening end of the air supply nozzle on the flapper assembly side so that the diameter of the tapered surface gradually increases, and that the aforementioned one of the pair of opening/closing control surfaces, which is adjacent to the air supply nozzle, be provided with a conical-shaped opening/closing control surface shaped to correspond to the shape of the tapered surface.

The diameter of the air exhaust nozzle can be made constant, and it is desirable that the other of the pair of opening/closing control surfaces, which is adjacent to the air exhaust nozzle, be provided with a needle-like opening/closing control surface (34) which is tapered in a direction away from the flapper assembly.

For instance, it is possible that the pair of opening/closing control surfaces each be formed integral with a flapper, the outer edge of which being fixed.

It is possible that a pair of flappers be provided at opposite ends of the flapper assembly, respectively, and that the pair of opening/closing control surfaces be formed integral with the pair of flappers to face the opening end of the air supply nozzle and the opening end of the air exhaust nozzle, respectively.

The flapper-assembly moving mechanism can be a manually driven type, a pneumatically driven type, a hydraulically driven type, or a type driven with piezoelectric element. However, in view of controllability, it is desirable that the flapper-assembly moving mechanism be of an electromagnetically driven type which is controlled electromagnetically.

For instance, the flapper-assembly moving mechanism can be composed of a permanent magnet fixed to the flapper assembly, and a fixed coil portion which produces an electromagnetic effect between the fixed coil-yoke portion and the permanent magnet to move the flapper assembly.

The present invention proposes a more desirable embodiment of the electromagnetically driven type of the flapper-assembly moving mechanism. According to the flapper-assembly moving mechanism, the permanent magnet is formed in a cylindrical columnar shape, wherein the flapper assembly includes a pair of flappers including the pair of opening/closing control surfaces, respectively. Central portions of the pair of flappers are connected to each other via a connecting member which includes two magnet yokes positioned at opposite ends of the permanent magnet. The fixed coil portion includes a pair of fixed coils which are positioned around the permanent magnet and the two magnet yokes to be symmetrical with respect to a central position of the flapper assembly; a pair of coil yokes positioned on opposite sides of the pair of fixed coils, respectively; and a pair of coil yokes positioned around the pair of fixed coils, respectively. Opposite end surfaces of the pair of coil yokes on the pair of flappers sides are positioned outside of outward end surfaces of the two magnet yokes, respectively. The fluid control valve is controlled so that directions of flow of currents passing through the pair of fixed coils become opposite to each other.

It is desirable that the flapper assembly move linearly in a direction orthogonal to both a plane in which the opening end of the air supply nozzle lies and a plane in which the opening end of the air exhaust nozzle lies.

DESCRIPTION OF THE PREFERRED EMBODIMENTS

Figure 1:
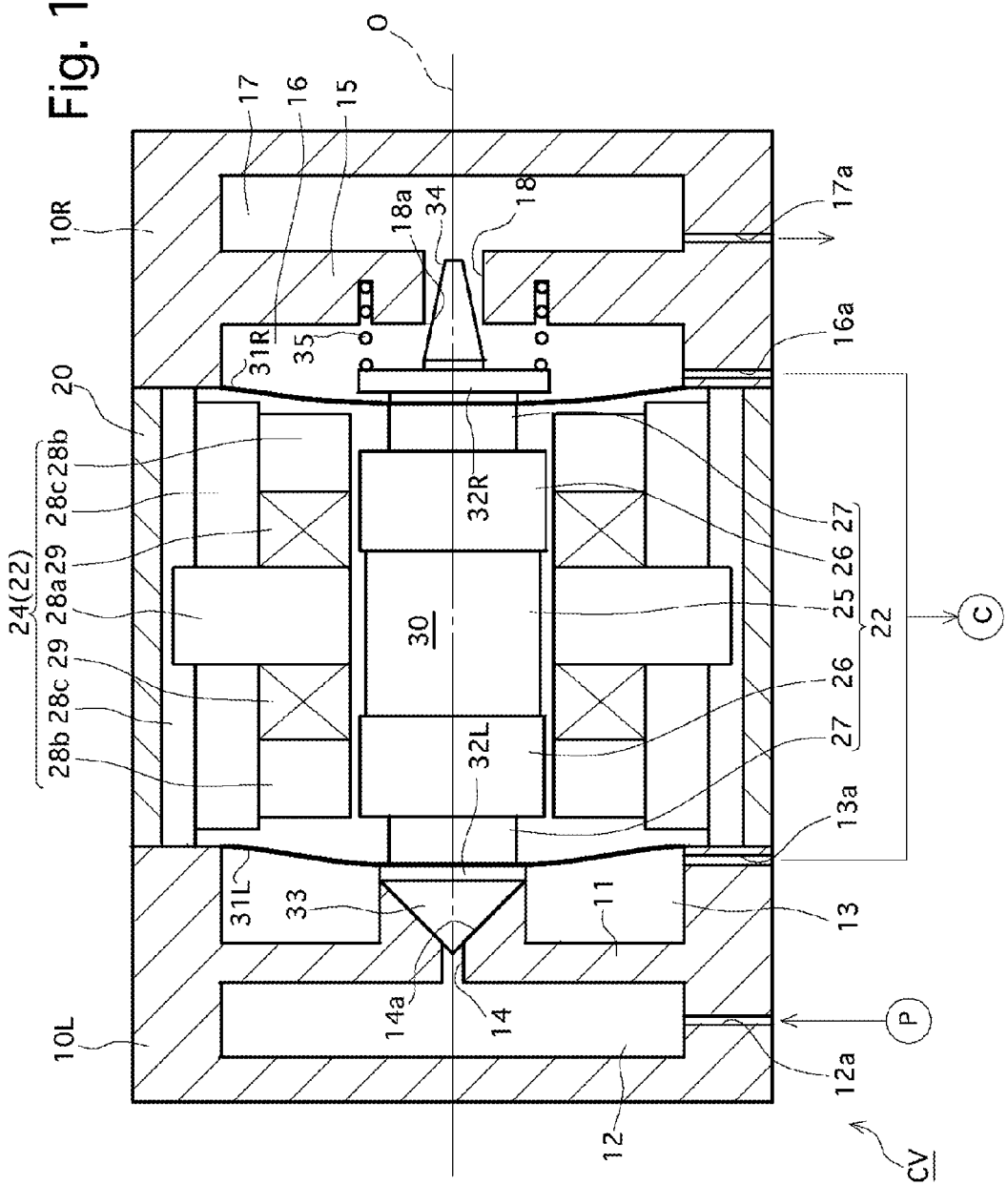
FIG. 1 is a longitudinal cross sectional view of an embodiment of a fluid control valve according to the present invention, showing a state where the fluid control valve is not energized.
Figure 2:
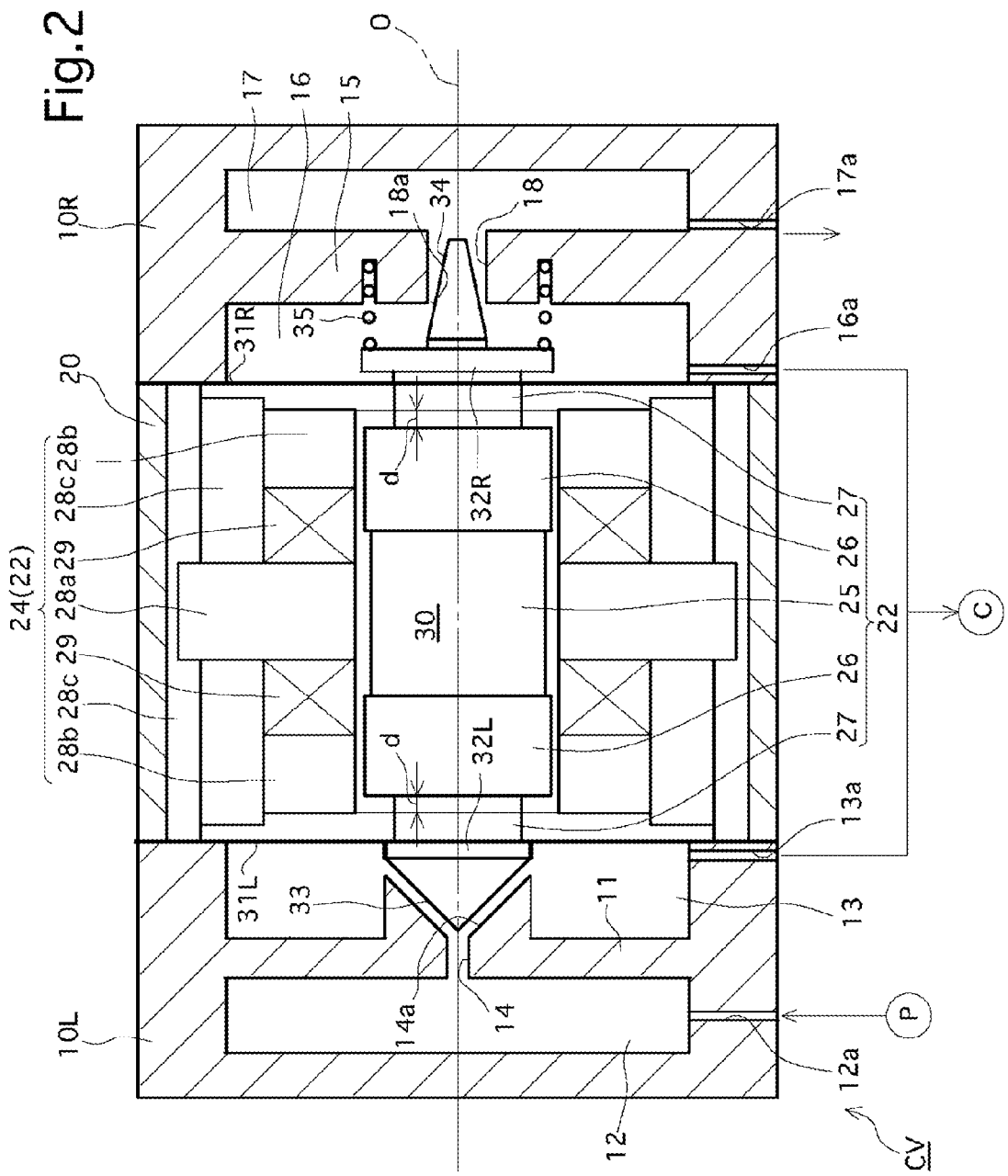
FIG. 2 is a longitudinal cross sectional view of the fluid control valve shown in FIG. 1, showing a state where the fluid control valve is energized.

FIGS. 1 and 2 show a first embodiment of a fluid control valve CV according to the present invention. The fluid control valve CV has a generally columnar shape which is rotationally symmetrical about an axis O. The fluid control valve CV is provided with a left fluid channel block 10L and a right fluid channel block 10R, and is further provided, at a center of the fluid control valve CV between the left fluid channel block 10L and the right fluid channel block 10R, with a control block 20. The fluid control valve CV is provided in the left fluid channel block 10L with an air supply port chamber 12 and a control port chamber 13 which are isolated from each other by a partition 11 formed therebetween. The fluid control valve CV is provided, in the left fluid channel block 10L on the axis O, with an air supply nozzle 14 which is formed through the partition 11 so that the air supply port chamber 12 and the control port chamber 13 are communicatively connected to each other through the air supply nozzle 14. The left fluid channel block 10L is provided, adjacent to one end of the air supply nozzle 14 on the control block 20 side, with a tapered surface 14a, the diameter of which gradually increases in a direction toward the control block 20.

The fluid control valve CV is provided in the right fluid channel block 10R with a control port chamber 16 and an air exhaust port chamber 17 which are isolated from each other by a partition 15 formed therebetween, similar to the left fluid channel block 10L. The fluid control valve CV is provided, in the right fluid channel block 10R on the axis O, with an air exhaust nozzle 18 having a constant diameter which is formed through the partition 15 so that the control port chamber 16 and the air exhaust port chamber 17 are communicatively connected to each other through the air exhaust nozzle 18. Accordingly, the air supply nozzle 14 and the air exhaust nozzle 18 are aligned and positioned on a common straight line (the axis O).

The air supply port chamber 12 is communicatively connected to a pressurized air source P through an air supply port 12a. The control port chamber 13 and the control port chamber 16 are communicatively connected to a control apparatus C through a control port 13a and a control port 16a, respectively. The air exhaust port chamber 17 is communicatively connected to the atmosphere through an exhaust port 17a. The control port chamber 13 and the control port chamber 16 are communicatively connected to each other.

The control block 20 that is positioned between the left fluid channel block 10L and the right fluid channel block 10R is provided with a flapper assembly 30 and a flapper-assembly moving mechanism (electromagnetic drive mechanism) 22 for moving the flapper assembly 30 along the axis O. The flapper assembly 30 is provided with a round and elastically deformable left flapper 31L positioned on the left fluid channel block 10L side, and a round and elastically deformable right flapper 31R positioned on the right fluid channel block 10R side. The left and right flappers 31L and 31R are of the same type, and central portions thereof on the axis O are connected to each other via a central cylindrical columnar permanent magnet 25, left and right magnet yokes 26 and left and right flapper connecting pieces (laterally-symmetrical connecting members) 27. The outer edge of the left flapper 31L is sandwiched between the left fluid channel block 10L and the control block 20 to be fixed therebetween, and the outer edge of the right flapper 31R is sandwiched between the right fluid channel block 10R and the control block 20 to be fixed therebetween. The cylindrical columnar permanent magnet 25 is positioned in a center of the control block 20 in a floating state. Each of the left and right flappers 31L and 31R can be a perforated type.

Left and right opening/closing control bodies 32L and 32R which face the air supply nozzle 14 and the air exhaust nozzle 18 are fixed to the left and right flappers 31L and 31R, respectively. The left opening/closing control body 32L is provided with a conical-shaped opening/closing control surface (conical-shaped projection) 33 which is shaped to correspond to the shape of the tapered surface 14a. The right opening/closing control body 32R is provided with a needle-like opening/closing control surface (needle-like projection) 34, the tip of which is inserted into the air exhaust nozzle 18. The needle-like opening/closing control surface 34 is tapered in a direction away from the control block 20, and comes into contact with an opening end 18a, formed at one end of the air exhaust nozzle 18 on the control block 20 side, when fully inserted into the air exhaust nozzle 18. The fluid control valve CV is provided between the right opening/closing control body 32R and the partition 15 with a coil spring 35 which biases the flapper assembly 30 toward the air supply nozzle 14 so that the conical-shaped opening/closing control surface 33 is in intimate contact with the tapered surface 14a in normal times to prevent the air supply port chamber 12 and the control port chamber 13 from being communicatively connected to each other.

The flapper-assembly moving mechanism 22 is composed of the cylindrical columnar permanent magnet 25 of the control block 20, and a fixed coil-yoke portion (fixed coil portion) 24 that is positioned around the cylindrical columnar permanent magnet 25.

The fixed coil-yoke portion 24, that is generally hollow cylindrical has a laterally symmetrical shape, is provided with a central coil yoke 28a, a pair of coils (fixed coils) 29 positioned on opposite sides of the central coil yoke 28a, respectively, and a pair of end coil yokes 28b positioned on opposite sides of the pair of coils 29, respectively. The fixed coil-yoke portion 24 is further provided, around the central coil yoke 28a, the pair of coils 29 and the pair of end coil yokes 28b, with a pair of circumferential coil yokes 28c, respectively. Each coil 29 is made from a series of loops of wire, and the pair of coils 29 are wound in the same direction and connected to a control circuit 44 (see FIGS. 4 and 5) so that the directions of flow of currents passing through the pair of coils 29 become opposite to each other. When the flapper assembly 30 is in the neutral position thereof, laterally opposite end surfaces (outward end surfaces) of the pair of end coil yokes 28b of the fixed coil-yoke portion 24 are positioned slightly outside of the laterally opposite ends (outward end surfaces) of the left and right magnet yokes 26 by distances d (see FIG. 2), respectively.

Operations of the first embodiment of the fluid control valve having the above described structure will be discussed hereinafter. In a state where the pair of coils 29 of the flapper-assembly moving mechanism 22 are not energized, the flapper assembly 30 is moved toward the air supply nozzle 14 by the spring force of the coil spring 35 as shown in FIG. 1 to bring the conical-shaped opening/closing control surface 33 into intimate contact with the tapered surface 14a to thereby prevent the air supply port chamber 12 and the control port chamber 13 (the control port chamber 16) from being communicatively connected to each other. Namely, the pressure from the pressurized air source P is not exerted on the control apparatus C.

Upon a current being passed through each of the pair of coils 29 of the flapper-assembly moving mechanism 22 in a predetermined direction (forward or reverse direction), currents flow through the pair of coils 29 in the opposite directions, respectively. Hence, magnetic poles of the same polarity (north or south pole) occur in the pair of end coil yokes 28b, respectively, while the magnetic pole (south or north pole) different from these magnetic poles that occur in the pair of end coil yokes 28b occurs in the central coil yoke 28a. Therefore, the cylindrical columnar permanent magnet 25 undergoes repulsive or attractive force produced between the magnetized central coil yoke 28a and the magnetized pair of end coil yokes 28b.

In a state where the cylindrical columnar permanent magnet 25 is in the neutral position thereof, since the outward end surfaces of the pair of end coil yokes 28b are positioned slightly away from the laterally opposite ends of the left and right magnet yokes 26 by the distances d, respectively, an attractive force (or a repulsive force) occurs between one of the outward end surfaces of the pair of end coil yokes 28b and the cylindrical columnar permanent magnet 25 when a repulsive force (or an attractive force) occurs between the other of the outward end surfaces of the pair of end coil yokes 28b and the cylindrical columnar permanent magnet 25. Therefore, the flapper assembly 30 is subjected to a strong force, so that the flappers 31L and 31R are elastically deformed while the flapper assembly 30 moves rightward as viewed in FIG. 2. Thereupon, an annular gap is created between the tapered surface 14a and the conical-shaped opening/closing control surface 33 while the distance between the opening end 18a of the air exhaust nozzle 18 and the needle-like opening/closing control surface 34 becomes small. Namely, the distance between the conical-shaped opening/closing control surface 33 of the flapper assembly 30 and an opening end (the tapered surface 14a) of the air supply nozzle 14 increases while the distance between the needle-like opening/closing control surface 34 and the opening end 18a of the air exhaust nozzle 18 decreases. As a result, the air supply port chamber 12 and the control port chamber 13 (the control port chamber 16) are communicatively connected to each other so that the pressure from the pressurized air source P is exerted on the control apparatus C. At the early stage of this movement (the rightward movement as viewed in FIG. 2) of the flapper assembly 30, the control port chamber 16 and the air exhaust port chamber 17 are communicatively connected to each other through the air exhaust nozzle 18, so that the air in the control port chamber 13 (the control port chamber 16) is released to the atmosphere through the exhaust port 17a, and therefore, the pressure in the control port chamber 13 (the control port chamber 16) is maintained lower than the pressure in the air supply port chamber 12.

The amount of movement of the flapper assembly 30 against the coil spring 35 can be controlled by controlling the amount of current passed through the pair of coils 29. If the flapper assembly 30 is fully moved so that the opening end 18a of the air exhaust nozzle 18 is shut by the needle-like opening/closing control surface 34, the air in the control port chamber 13 (the control port chamber 16) is prevented from being released to the atmosphere through the air exhaust nozzle 18, which causes the pressure in the control port chamber 13 (the control port chamber 16) to rise and eventually become equal to the pressure in the air supply port chamber 12. Accordingly, the output pressure of the control port chamber 13 (the control port chamber 16) can be controlled by controlling the amount of current passed through the pair of coils 29.

In the first embodiment of the fluid control valve, air flows through the annular gap that is created between the tapered surface 14a and the conical-shaped opening/closing control surface 33 to gradually expand (increase in diameter) when the air in the air supply port chamber 12 flows into the control port chamber 13. Additionally, in the first embodiment of the fluid control valve, air flows through the annular gap that is created between the needle-like opening/closing control surface 34 and the opening end 18a of the air exhaust nozzle 18 to gradually expand (increase in diameter) when the air in the control port chamber 16 flows into the air exhaust port chamber 17. Therefore, a stable air flow can be produced with no uncertain vortexes, no shock waves, no boundary-layer separation point variations, no stagnation, etc., which makes it possible to raise the pressure in the control port chamber 13 (the control port chamber 16) smoothly.

Although the air supply port chamber 12 and the control port chamber 13 (the control port chamber 16) can be made so as not to be communicatively connected to each other when the pair of coils 29 are not energized because the coil spring 35 is used in the above illustrated embodiment of the fluid control valve, it is possible to omit the coil spring 35 depending on properties of the control apparatus C and to form a constant gap between the tapered surface 14a of the air supply nozzle 14 and the conical-shaped opening/closing control surface 33 of the left opening/closing control body 32L at all times in a state where the pair of coils 29 are not energized (so as to hold the flapper assembly 30 in a neutral position). In this case, it is possible to vary the size of the gap between the tapered surface 14a and the conical-shaped opening/closing control surface 33 to control the pressure in the control port chamber 13 (the control port chamber 16) by changing the directions of flow of currents passing through the pair of coils 29.

Figure 3:
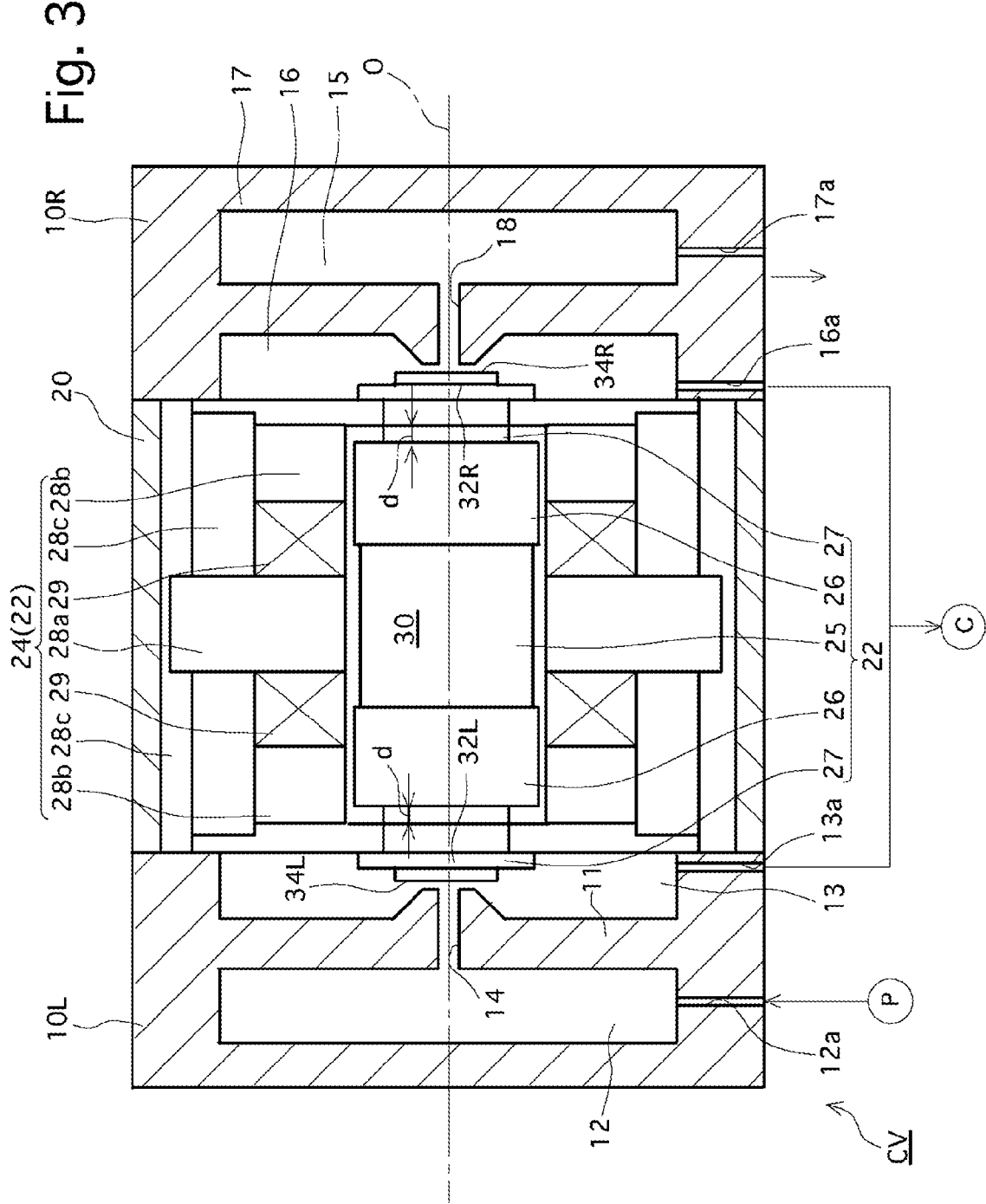
FIG. 3 is a longitudinal cross sectional view of a more universal embodiment of the fluid control valve according to the present invention.

FIG. 3 shows a more universal embodiment (second embodiment) of the fluid control valve according to the present invention. In this embodiment, the fluid control valve CV is not provided with the conical-shaped opening/closing control surface 33 and the needle-like opening/closing control surface 34 that the first embodiment of the fluid control valve has, and the left and right opening/closing control bodies 32L and 32R are provided with flat opening/closing control surfaces 34L and 34R, respectively. In addition, the fluid control valve CV is not provided with the coil spring 35 that the first embodiment of the fluid control valve has. According to this embodiment of the fluid control valve, effects similar to those obtained in the first embodiment of the fluid control valve can be obtained except for the effects of a combination of the tapered surface 14a and the conical-shaped opening/closing control surface 33 and a combination of the opening end 18a and the needle-like opening/closing control surface 34.

It is desirable that the flapper-assembly moving mechanism 22 be configured to move the flapper assembly 30 linearly on the axis O. The flapper-assembly moving mechanism can be of a manually driven type, a pneumatically driven type, a hydraulically driven type, or a type driven with piezoelectric element. In view of controllability, cost reduction and space saving, it is desirable that the flapper-assembly moving mechanism 22 be of an electromagnetically driven type and that the relative position between a permanent magnet and coils be such that the permanent magnet and the coils are arranged on the flapper assembly side and the fixed portion side, respectively, in a manner similar to that in each of the above illustrated embodiments of the fluid control valves. The pair of coils 29 can be a composite coil made of a series of loops of coils or two independent coils which are wound in the opposite directions and arranged so that the directions of flow of currents passing through the two coils are opposite to each other.

Figure 4:
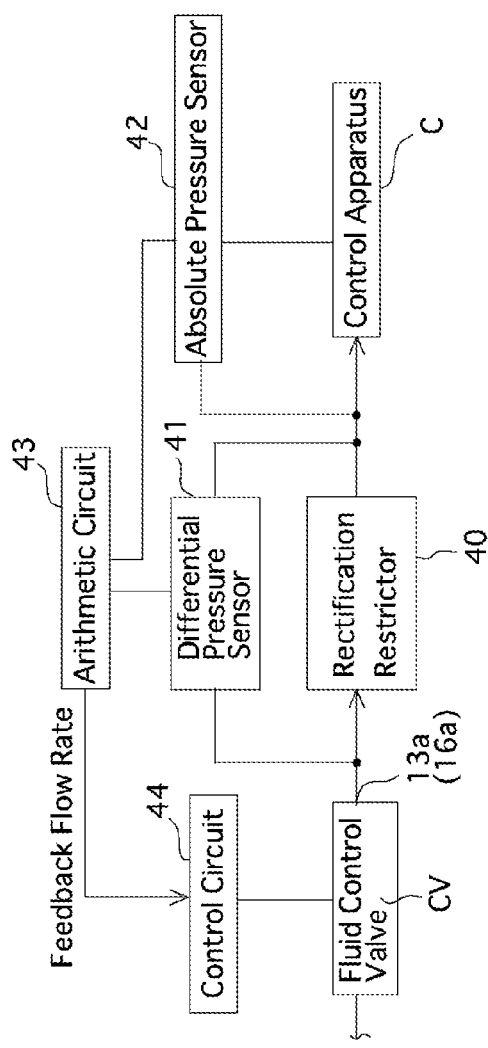
FIG. 4 is a schematic block diagram of an example of a system in which the fluid control valve according to the present invention is used in combination with a control apparatus.

The fluid control valve CV according to the present invention can be used in various ways and for various purposes. FIG. 4 shows an example of a combination of the fluid control valve CV according to the present invention and the control apparatus C. In this example, a rectification restrictor 40 is installed between the fluid control valve CV and the control apparatus C so that a more precise output pressure can be taken out. The rectification restrictor 40 is connected to the control ports 13a and 16a. The rectification restrictor 40 operates to reduce fluctuations of pressure on the input side so that a pressure with small fluctuations is taken out from the output side. The configuration of the rectification restrictor 40 can be any configuration. The rectification restrictor 40 is provided with a differential pressure sensor 41 for detecting the differential pressure between the pressure on the input side and the pressure on the output side, and an absolute pressure sensor 42 for detecting the absolute pressure between the pressure on the input side and the pressure on the output side. The absolute pressure sensor 42 can be arranged on either the input side or the output side of the rectification restrictor 40 or both sides (the input side and the output side) of the rectification restrictor 40 in consideration of the quantity of flow (flow rate) through the rectification restrictor 40 or the pressure of air flow thereat. An arithmetic circuit 43 integrates the differential pressure detected by the differential pressure sensor 41 and the absolute pressure detected by the absolute pressure sensor 42 to calculate the quantity of flow on the output side of the rectification restrictor 40. A signal representing this quantity of flow is fed back to the control circuit 44 of the fluid control valve CV so that a more precise control pressure is taken out from the control ports 13a and 16a. It is possible to use a combination of a gauge pressure sensor (not shown) and a pneumatic sensor (not shown) instead of the absolute pressure sensor 42. If this combination of these sensors are connected to the rectification restrictor 40, a more precise detection is possible because fluid temperature can be adopted as one of correction factors for fluid computing.

An isothermal pneumatic cylinder apparatus which includes a pneumatic cylinder filled with a synthetic fiber material such as a polyester fiber material can be used as the control apparatus C that is connected to the output of the rectification restrictor 40. It is desirable that the pneumatic cylinder be filled with this synthetic fiber material at a filling ratio of a few percent with respect to the internal volume of the pneumatic cylinder. This type of isothermal pneumatic cylinder apparatus is conventionally known for its function of reducing momentary variations in temperature which are caused upon a mass of air being loaded into and unloaded from the pneumatic cylinder, thus making a high-precision flow rate control possible.

Figure 5:
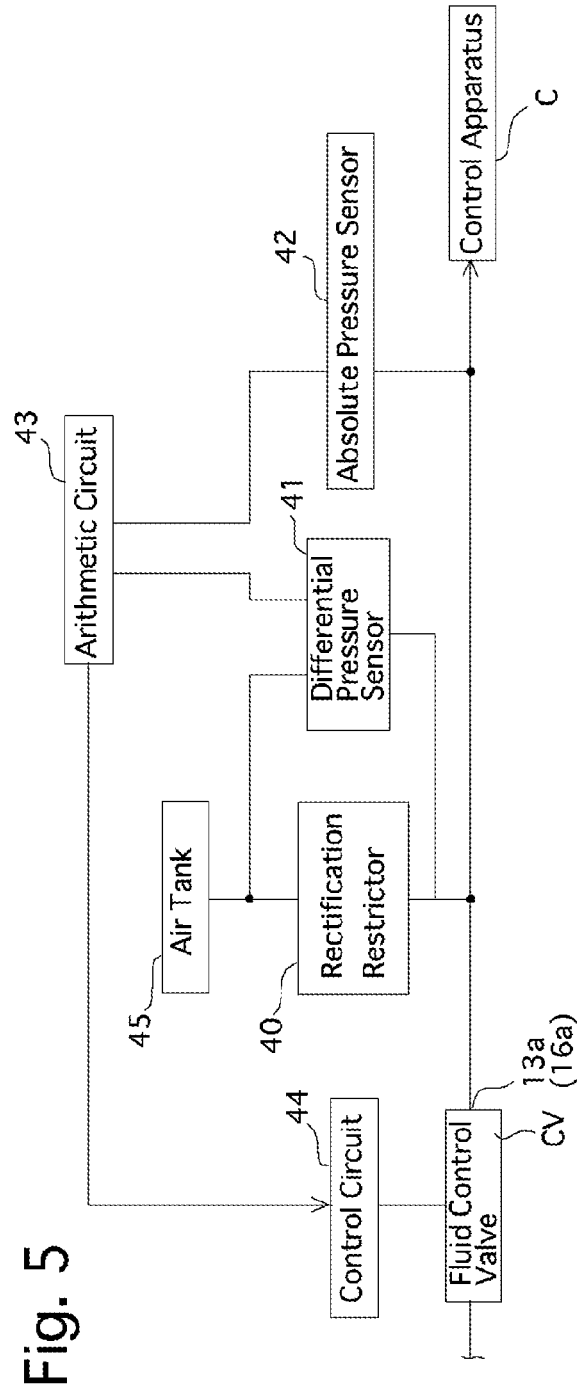
FIG. 5 is a schematic block diagram of another example of the system in which the fluid control valve according to the present invention is used in combination with the control apparatus.

FIG. 5 shows another example of a combination of the fluid control valve CV according to the present invention and the control apparatus C. In this example, a branch circuit for the rectification restrictor 40 connected to an air tank 45 is installed between the fluid control valve CV and the control apparatus C so that a more precise output pressure can be taken out. The configuration of the periphery of the rectification restrictor 40 in FIG. 5 is the same as that in FIG. 4, and elements shown in FIG. 5 which are similar to those shown in FIG. 4 are designated by the same reference numerals. In this application, since the rectification restrictor 40 is not interposed between the fluid control valve CV and the isothermal pneumatic cylinder apparatus (the control apparatus C), the fluid channel resistance can be substantially reduced, which achieves a high-speed control of the isothermal pneumatic cylinder apparatus possible.

INDUSTRIAL APPLICABILITY

According to the present invention, a quick-response fluid control valve can be obtained. Additionally, according to the present invention, a fluid control valve which exhibits a stable performance and presents no problems such as the occurrence of shock waves can be obtained, so that the fluid control valve can be applied to various pressure control apparatuses.

The invention claimed is:

1. A fluid control valve comprising:
a pressure chamber including an output port;
an air supply nozzle and an air exhaust nozzle which are communicatively connected to said pressure chamber and positioned on a common straight line;
a flapper assembly which is movable between said air supply nozzle and said air exhaust nozzle and includes a pair of opening/closing control surfaces that face an opening end of said air supply nozzle and an opening end of said air exhaust nozzle, respectively; and
an electromagnetic drive mechanism which moves said flapper assembly so that a distance between said opening end of said air supply nozzle and one of said pair of opening/closing control surfaces increases while a distance between said opening end of said air exhaust nozzle and the other of said pair of opening/closing control surfaces decreases,
wherein said electromagnetic drive mechanism comprises:
a permanent magnet fixed to said flapper assembly, said permanent magnet being formed in a cylindrical columnar shape; and
a fixed coil portion which produces an electromagnetic effect between said fixed coil-yoke portion and said permanent magnet to move said flapper assembly,
wherein said flapper assembly comprises a pair of flappers including said pair of opening/closing control surfaces, respectively,
wherein central portions of said pair of flappers are connected to each other via a connecting member which includes two magnet yokes positioned at opposite ends of said permanent magnet,
wherein said fixed coil portion includes a pair of fixed coils which are positioned around said permanent magnet and said two magnet yokes to be symmetrical with respect to a central position of said flapper assembly; a pair of coil yokes positioned on opposite sides of said pair of fixed coils, respectively; and a pair of coil yokes positioned around said pair of fixed coils, respectively,
wherein opposite end surfaces of said pair of coil yokes on said pair of flappers sides are positioned outside of outward end surfaces of said two magnet yokes, respectively, and
wherein said fluid control valve is controlled so that directions of flow of currents passing through said pair of fixed coils become opposite to each other.

2. The fluid control valve according to claim 1, further comprising a spring device which biases said flapper assembly to move said flapper assembly in a direction to make said one of said pair of opening/closing control surfaces come into intimate contact with said air supply nozzle to close said air supply nozzle.

3. The fluid control valve according to claim 1, further comprising a tapered surface which is formed at said opening end of said air supply nozzle on said flapper assembly side so that a diameter of said tapered surface gradually increases,
   wherein said one of said pair of opening/closing control surfaces, which is adjacent to said air supply nozzle, comprises a conical-shaped opening/closing control surface shaped to correspond to a shape of said tapered surface.

4. The fluid control valve according to claim 1, wherein a diameter of said air exhaust nozzle is constant, and
   wherein said other of said pair of opening/closing control surfaces, which is adjacent to said air exhaust nozzle, comprises a needle-like opening/closing control surface which is tapered in a direction away from said flapper assembly.

5. The fluid control valve according to claim 1, wherein said flapper assembly comprises a pair of flappers outer edges of which are fixed, said pair of opening/closing control surfaces being formed integral with central portions of said pair of flappers, respectively.

6. The fluid control valve according to claim 5, wherein said pair of flappers are provided at opposite ends of said flapper assembly, respectively, and
   wherein said pair of opening/closing control surfaces are formed integral with said pair of flappers to face said opening end of said air supply nozzle and said opening end of said air exhaust nozzle, respectively.

7. The fluid control valve according to claim 1, wherein said flapper assembly moves linearly in a direction orthogonal to both a plane in which said opening end of said air supply nozzle lies and a plane in which said opening end of said air exhaust nozzle lies.

\* \* \* \* \*